US011692856B1

(12) United States Patent
Siracki

(10) Patent No.: US 11,692,856 B1
(45) Date of Patent: Jul. 4, 2023

(54) ROTARY ENCODER SHAFT CLAMP

(71) Applicant: Nidec Motor Corporation, St. Louis, MO (US)

(72) Inventor: Glenn Siracki, Burton, OH (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 17/831,474

(22) Filed: Jun. 3, 2022

(51) Int. Cl.
*G01D 11/30* (2006.01)
*F16C 41/00* (2006.01)
*G01D 11/24* (2006.01)

(52) U.S. Cl.
CPC ............ *G01D 11/30* (2013.01); *F16C 41/007* (2013.01); *G01D 11/245* (2013.01)

(58) Field of Classification Search
CPC ...... G01D 11/30; G01D 11/245; F16C 41/007
See application file for complete search history.

(56) References Cited

U.S. PATENT DOCUMENTS

| | | | |
|---|---|---|---|
| 6,903,476 B2 | 6/2005 | Sakamoto | |
| 9,124,156 B2 * | 9/2015 | Ikuta | ................ H02K 1/276 |

FOREIGN PATENT DOCUMENTS

| | | |
|---|---|---|
| CN | 101093945 | 2/2007 |
| CN | 202550739 | 11/2012 |
| CN | 202651940 | 1/2013 |
| CN | 203368170 | 12/2013 |
| CN | 102716780 | 12/2014 |
| CN | 206595790 | 10/2017 |
| CN | 207269173 | 4/2018 |
| CN | 207968114 | 10/2018 |
| CN | 109742873 | 12/2018 |
| CN | 112385119 | 2/2019 |
| CN | 208638182 | 3/2019 |
| CN | 208835868 | 5/2019 |
| CN | 107528441 | 8/2019 |
| CN | 110429729 | 8/2019 |
| CN | 209434990 | 9/2019 |
| CN | 112910186 | 12/2019 |
| CN | 209767259 | 12/2019 |
| CN | 210380419 | 4/2020 |
| CN | 112018968 | 7/2020 |
| CN | 211579833 | 9/2020 |
| CN | 112653276 | 12/2020 |
| CN | 110131036 | 2/2021 |

(Continued)

*Primary Examiner* — Jamel E Williams
(74) *Attorney, Agent, or Firm* — Hovey Williams LLP

(57) ABSTRACT

An encoder includes a rotatable encoder disc. A clamp is fixed to the encoder disc to rotate therewith. The clamp includes an arcuately extending body presenting a radially inner face and arcuately spaced apart ends defining a gap therebetween. The inner face extends along a clamping path and engages a rotating component to secure the clamp to the rotating component to rotate therewith. The clamp includes an adjustment mechanism for modifying an arcuate extent of the gap by shifting the ends relative to one another and, in turn, modifying the clamping path. The body defines a radially extending cutout facilitating bending of the body in association with expansion or contraction of the gap and modification of the clamping path. The clamp includes a raised boss extending from a front face thereof. The boss presents a contact face spaced axially from the front face and fixedly engaging the encoder disc.

20 Claims, 11 Drawing Sheets

(56) References Cited

FOREIGN PATENT DOCUMENTS

| | | |
|---|---|---|
| CN | 113098205 | 3/2021 |
| EP | 1280262 | 7/2002 |
| EP | 1734646 | 7/2002 |
| EP | 2567102 | 10/2018 |
| JP | 2012157236 | 9/2011 |
| JP | 2016116316 | 12/2014 |
| JP | 5868513 | 1/2016 |
| JP | 6210711 | 9/2017 |
| JP | 2020092524 | 12/2018 |
| JP | 6723460 | 6/2020 |

* cited by examiner

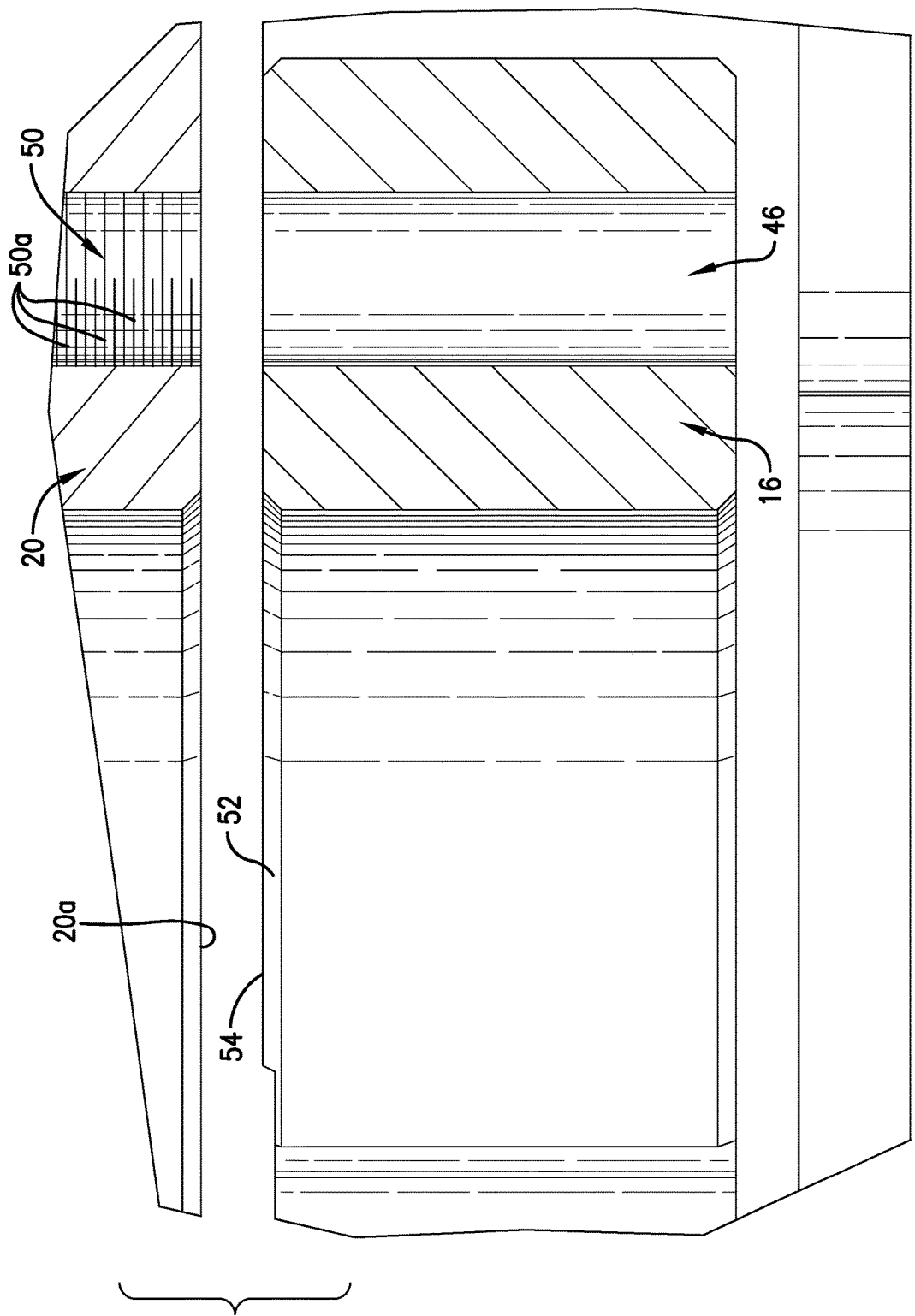

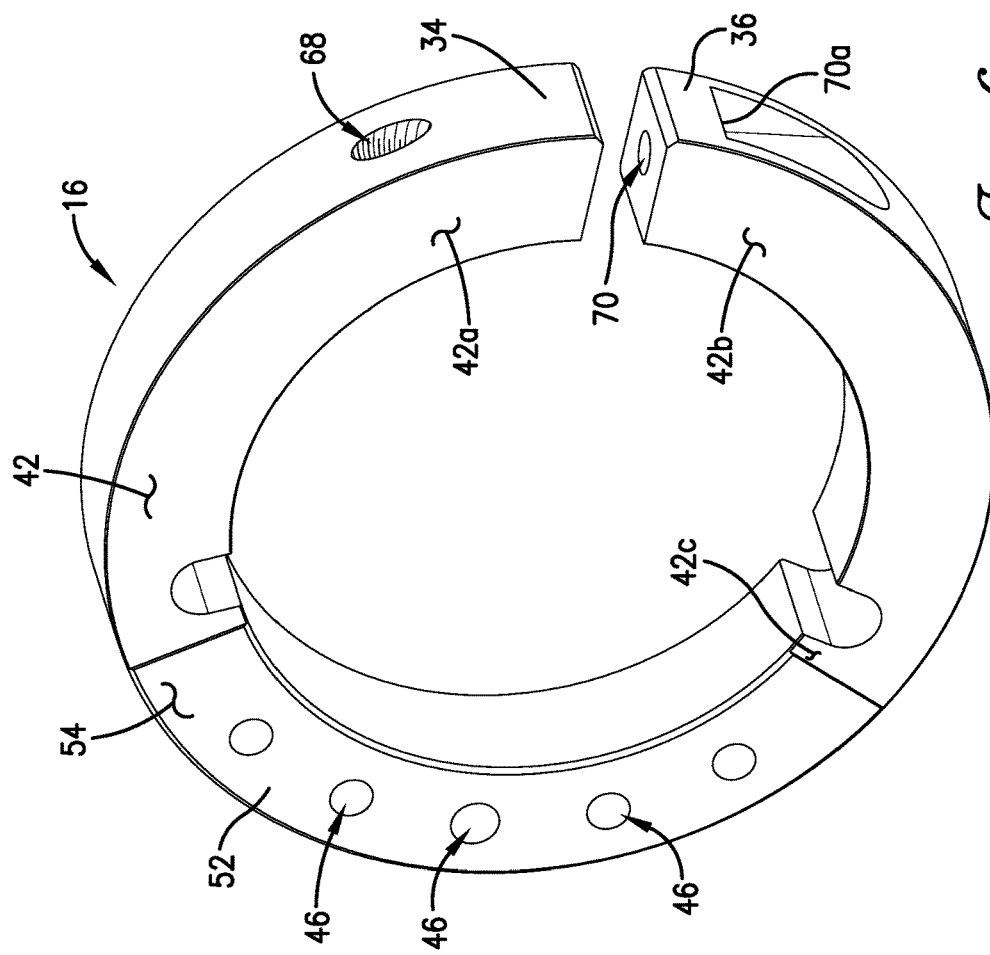
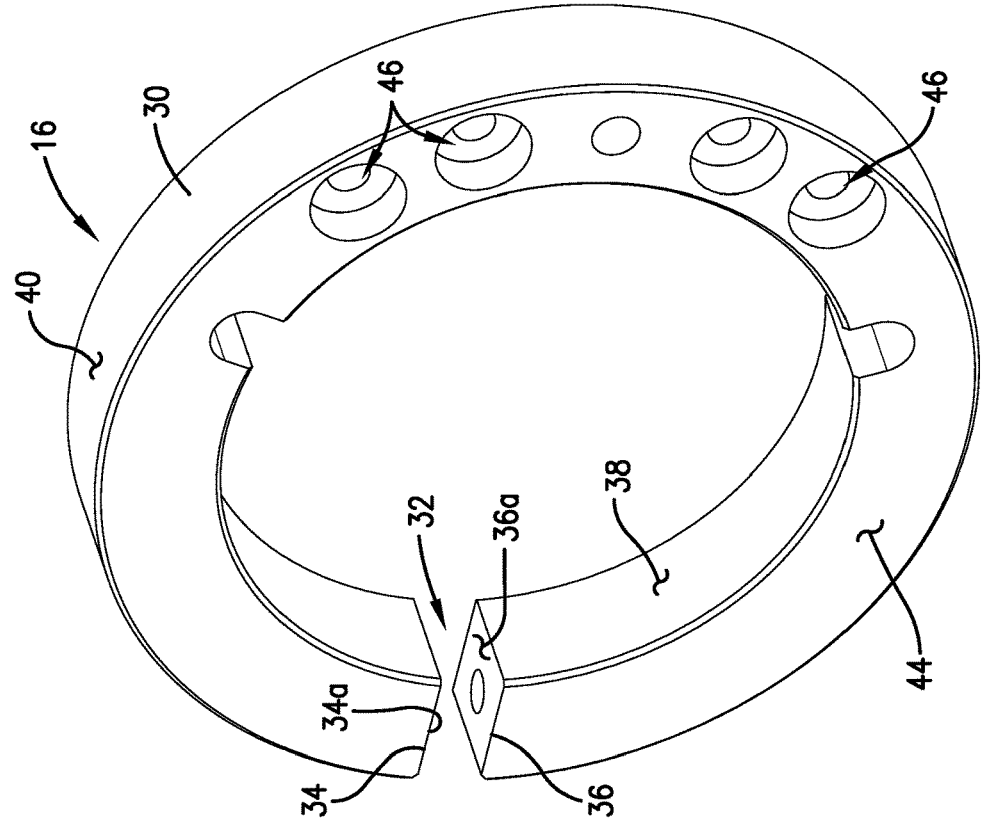

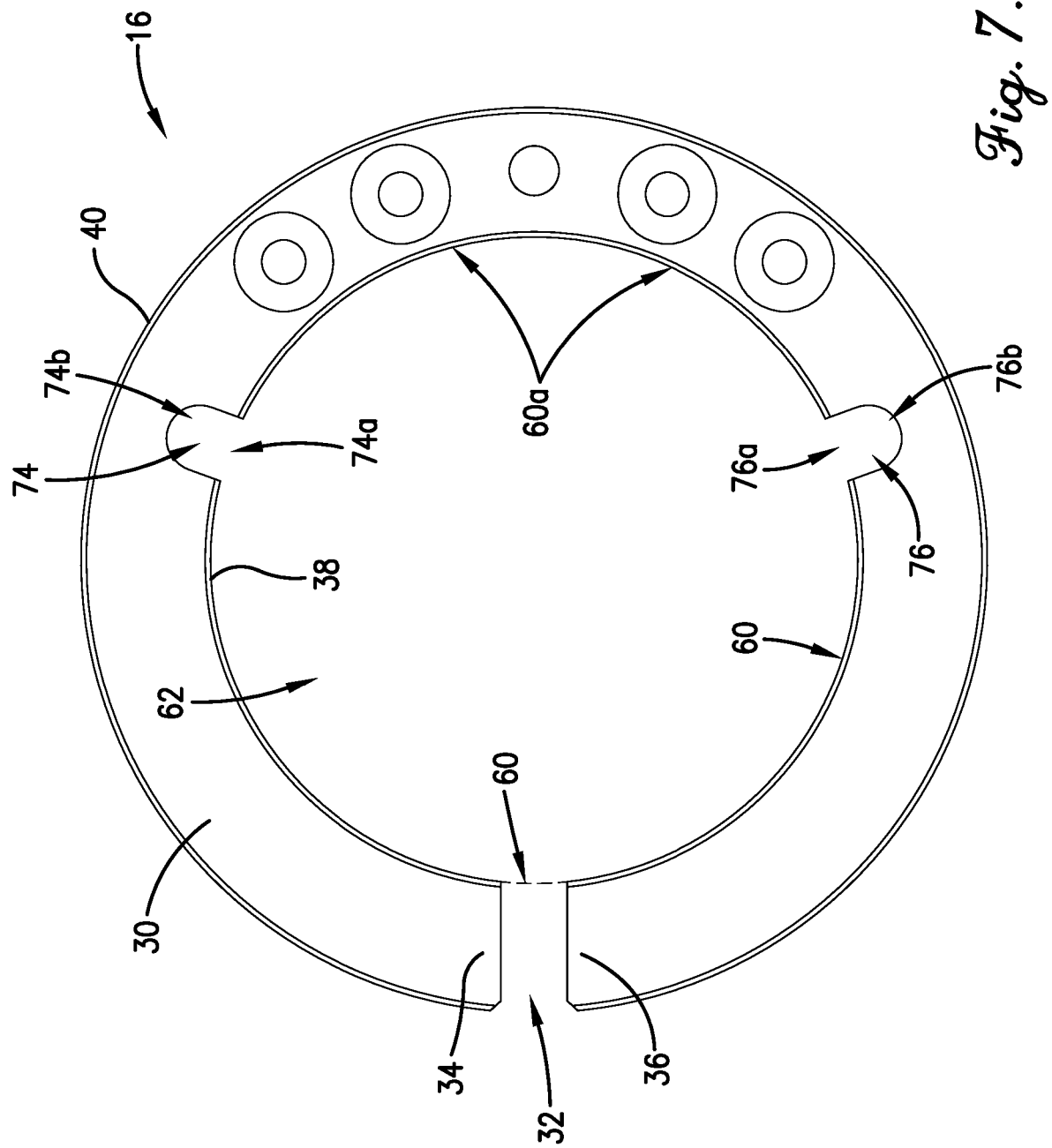

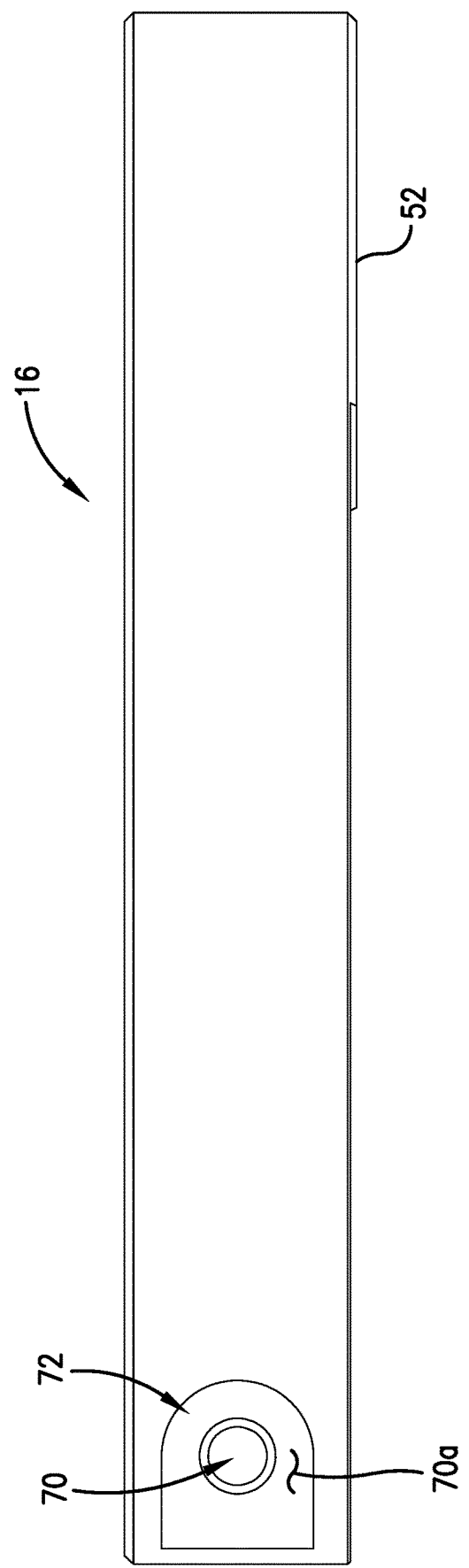

ROTARY ENCODER SHAFT CLAMP

CONTEMPORANEOUSLY FILED APPLICATION

The present application is filed contemporaneously with U.S. Design patent application Ser. No. 29/841,146 entitled ROTARY ENCODER SHAFT CLAMP, the entire disclosure of which is hereby incorporated by reference herein.

BACKGROUND OF THE INVENTION

1. Field of the Invention

The present invention relates generally to securement of a motor shaft to a rotatable encoder disc to prevent relative rotation therebetween.

2. Discussion of the Prior Art

Conventional devices including a rotating component may include an encoder to detect rotation angle of the rotating component and, in turn, provide a signal that may be used to determine position, speed, direction, and count of the rotating component. For instance, in a conventional electric motor, an encoder may be provided to detect and send signals pertaining to the speed and position of a rotatable motor shaft. Such signals may thereafter be processed and analyzed (for example, by a controller) in view of desired motor performance. Adjustments to control signals may then be made, if necessary.

A variety of techniques are known for mounting encoders to motors. Such techniques aim to couple the encoder to the rotating shaft to ensure synchronous rotation of the shaft and the rotating parts of the encoder (for example, the encoder disc) but prevent rotation of the fixed portions of the encoder (for example, the encoder body).

SUMMARY

According to one aspect of the present invention, an encoder assembly is configured to be operably coupled with a rotating component. The encoder assembly comprises an encoder including a rotatable encoder disc. The encoder assembly further comprises a clamp configured to be secured to the rotating component to rotate therewith. The clamp is fixed to the encoder disc such that rotation of the encoder disc corresponds to rotation of the rotating component. The clamp includes an arcuately extending body presenting arcuately spaced apart first and second ends and radially spaced apart inner and outer faces. The ends define an arcuately extending gap therebetween. The inner face extends along a clamping path and is configured to at least in part engage the rotating component to secure the clamp to the rotating component. The clamp further includes an adjustment mechanism configured to modify an arcuate extent of the gap by shifting the first and second ends relative to one another and, in turn, modifying the clamping path of the inner face. The body defines a radially extending cutout therein. The cutout extends from one of the inner and outer faces and facilitates bending of the body in association with arcuate expansion or contraction of the gap and modification of the clamping path.

According to another aspect of the present invention, an encoder assembly is configured to be operably coupled with a rotating component. The encoder assembly comprises an encoder including an encoder disc rotatable about an axis. The encoder assembly further comprises a clamp configured to be secured to the rotating component to rotate therewith. The clamp is fixed to the encoder disc such that rotation of the encoder disc corresponds to rotation of the rotating component. The clamp includes an arcuately extending body presenting axially opposed front and back faces. The clamp further includes an axially raised boss extending from the front face and presenting a contact face spaced axially from the front face. The contact face fixedly engages the encoder disc. The front face is at least in part spaced axially from the encoder disc.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 3B is an exploded view of the portion of the encoder disc and clamp shown in FIG. 3A, also with shading provided for clarity;

FIG. 5 is an enlarged rear perspective view of the clamp of FIGS. 1-4;

FIG. 6 is a front perspective view of the clamp of FIG. 5;

FIG. 7 is a back view of the clamp of FIGS. 5 and 6;

FIG. 10 is a bottom view of the clamp of FIGS. 5-9.

Figure 1:
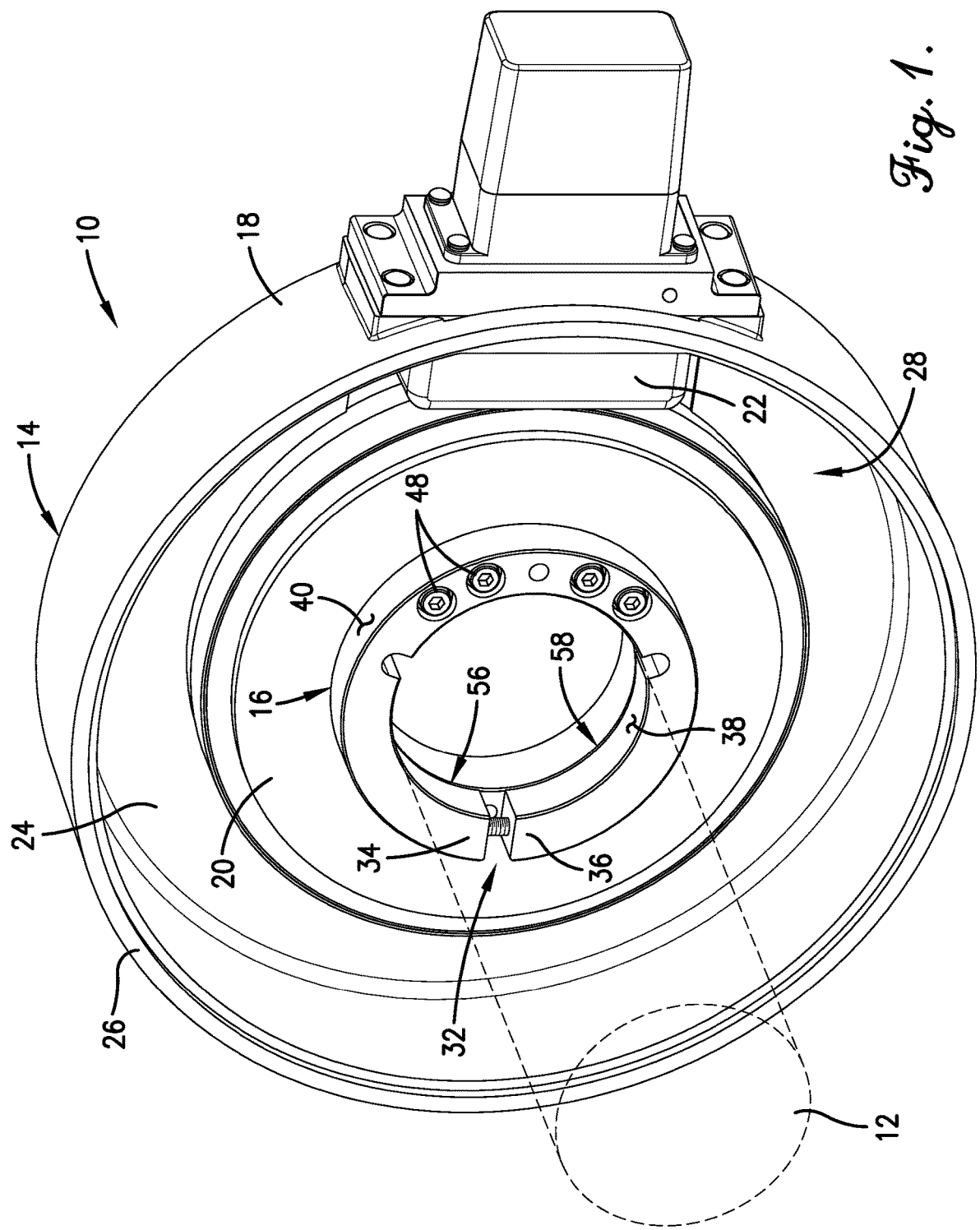
FIG. 1 is a rear perspective view of an encoder assembly and a motor shaft, particularly illustrating securement of the motor shaft to the encoder disc of the encoder assembly by means of a clamp.
Figure 2:
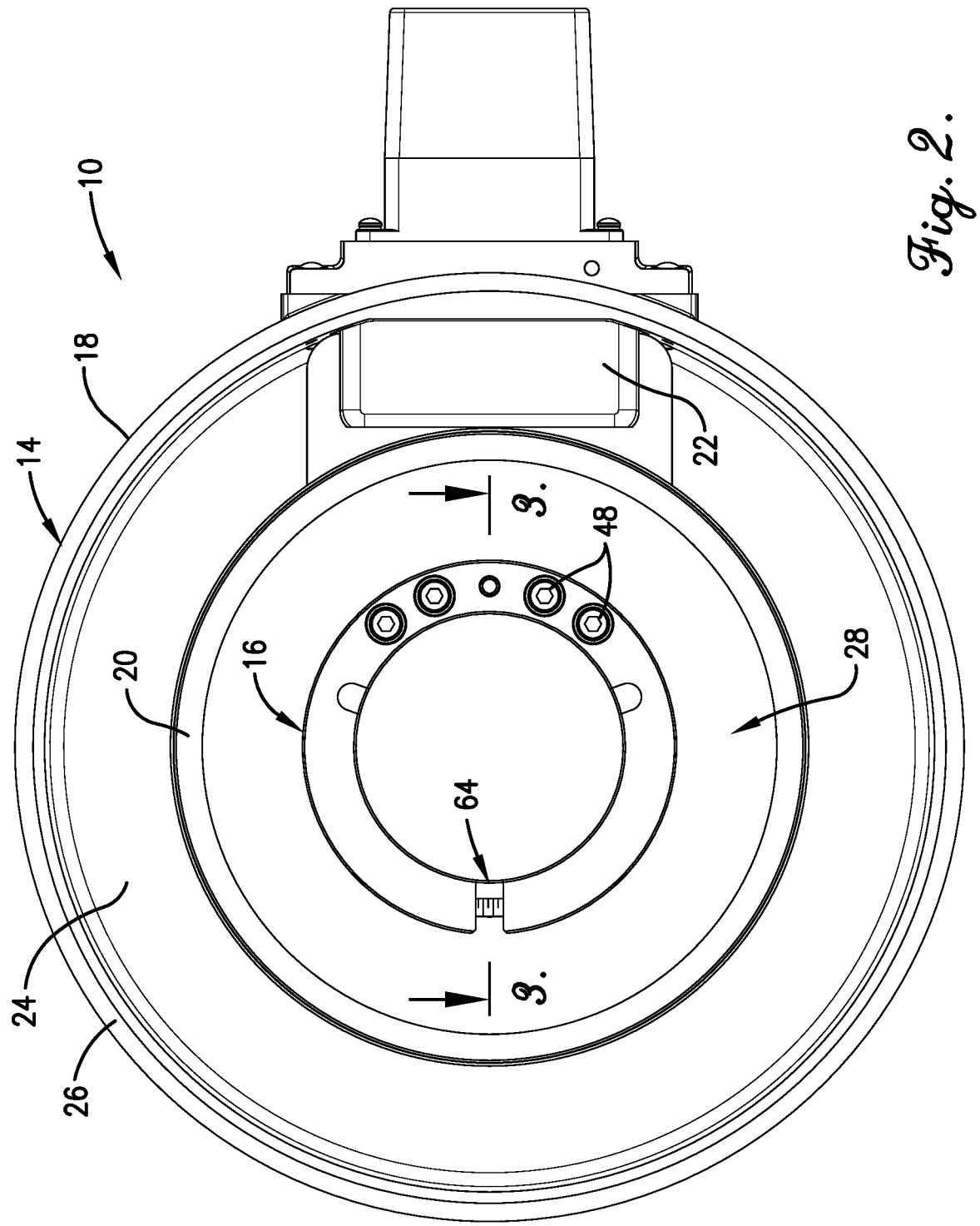
FIG. 2 is a rear view of the encoder assembly of FIG. 1.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the embodiments.

Furthermore, unless specified or made clear, the directional references made herein with regard to the present invention and/or associated components (for example, top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Overview

With initial respect to FIG. 1, an encoder assembly 10 and a rotating component 12 are illustrated. As will be discussed in greater detail below, the encoder assembly 10 is configured to be operably coupled with the rotating component 12.

The illustrated rotating component 12 is a motor shaft 12. The motor shaft 12 is preferably the output shaft of a motor (only the shaft 12 being shown), although other types of rotating shaft or component are permissible without departing from the scope of some aspects of the present invention.

The motor may be of any type and may be designed for any of a variety of applications. However, it is noted that the present invention is highly advantageous in applications involving heavy vibrations. For instance, the associated motor might in a preferred application be associated with offroad equipment for strip mining. Other applications, such use with elevator motors, are also permissible, however.

In the illustrated embodiment, the motor shaft 12 presents a round (that is, circular) cross-section. Alternate shapes are permissible, however, provided complementary adjustments to the encoder assembly are also made.

The encoder assembly 10 includes an encoder 14 and a shaft clamp 16. The encoder 14 broadly includes an encoder housing 18, a rotatable encoder disc or rotor 20, and a sensor assembly or disc reader 22.

In the illustrated embodiment, the housing 18 is generally toroidal in form, including an arcuately extending base 24 and an arcuate sidewall 26 extending axially from the base 24. The base 24 and the sidewall 26 cooperatively at least in part define an encoder chamber 28.

The housing 18 may comprise any of a variety of materials suited to the chosen application.

The sensor assembly 22 is preferably mounted to the housing 18 and, more particularly, to the sidewall 26 thereof, so as to be fixed relative thereto. The sensor assembly 22 preferably includes one or more sensors (not shown) for sensing the rotation angle of the disc 20 and, in turn, providing a signal that may be used to determine a parameter such as, but not limited to, position, speed, direction, and count of the disc 20. It is noted that, in some embodiments, more than one sensor assembly may be provided, as well.

The disc 20 is preferably generally toroidal in form and is disposed at least substantially within the encoder chamber 28. The disc 20 is rotatable about an axis. In a preferred embodiment, as discussed in greater detail below, the encoder assembly 10 is coupled to the shaft 12 such that rotation of the disc 20 is driven by the shaft 12. More particularly, the shaft 12 is connected to the disc 20 by the clamp 16. Alternatively stated, the clamp 16 is configured to be secured to the shaft 12 to rotate therewith, with the clamp 16 further being fixed to the encoder disc 20 such that rotation of the encoder disc 20 corresponds to rotation of the shaft 12. That is, the shaft 12 and the disc 20 rotate in unison (and, alternatively stated, do not rotate relative to one another).

It is noted that, provided synchronicity of rotation of the shaft 12 and the disc 20, the rotation-derived properties of the shaft 12 can be inferred or calculated from the measured information provided by the sensor assembly 22 with respect to the disc 20 itself. That is, upon proper coupling of the shaft 12 and the disc 20, the measured rotation angle of the disc 20 by the sensor assembly 22 will be the same as the (not directly measured) rotation angle of the shaft 12. Additional information (for example, pertaining to position, speed, direction, and count of the shaft 12) may also therefore be derived or taken directly from data associated with the disc 20.

As will be readily apparent to those of ordinary skill in the art, however, poor coupling between the disc and the shaft that allows for rotational slip between the disc and the shaft can lead to inaccurate rotational information regarding the shaft. Depending on the degree of slip and the demands of the given application, such inaccuracies may be highly detrimental. That is, exceptional accuracy is required in certain applications.

The encoder 14 is preferably a magnetic encoder. More particularly, the disc 20 preferably includes one or more sensed elements (not shown) configured to be sensed by the sensor of the sensor assembly 22. In the illustrated embodiment, for instance, the disc 20 is a magnetic disc and the sensed element is a magnet, with the sensor of the sensor assembly 22 being configured to detect the magnetic field thereof. It is permissible according to some aspects of the present invention, for the encoder to be of a different type, however. For instance, the encoder might instead be an optical encoder, with the sensed element being visual indicia.

Turning now to the clamp 16 itself, in a preferred embodiment, the clamp 16 includes a body 30 that is generally toroidal but with an arcuate discontinuity or gap 32 extending between first and second ends 34 and 36 thereof. Alternatively stated, the clamp body 30 extends arcuately between its first and second ends 34 and 36, which are spaced from one another by the gap 32. Thus, the clamp 16 and, more particularly, the body 30, are generally C-shaped in form.

The clamp 16 presents a radially inner face 38 and a radially outer face 40. The inner face 38 is configured to engage the shaft 12, as shown in FIG. 1. Thus, it will be apparent to those of ordinary skill in the art that the inner face 38 and the outer surface of the shaft 12 (at least where the shaft 12 and clamp 16 engage) should be complementarily sized and shaped. In the illustrated embodiment, for instance, the shaft 12 has a circular cross-section, and the inner face 38 extends along an arc of a circle. The outer face 40 similarly extends along an arc of a circle and is concentric with the inner face 38, although incongruities between the inner and outer faces fall within the scope of some aspects of the present invention.

Furthermore, as will be discussed in greater detail below, minor variations in size and/or shape of the shaft 12 are preferably accommodated by the design of the clamp 16, including the aforementioned gap 32.

Figure 4:
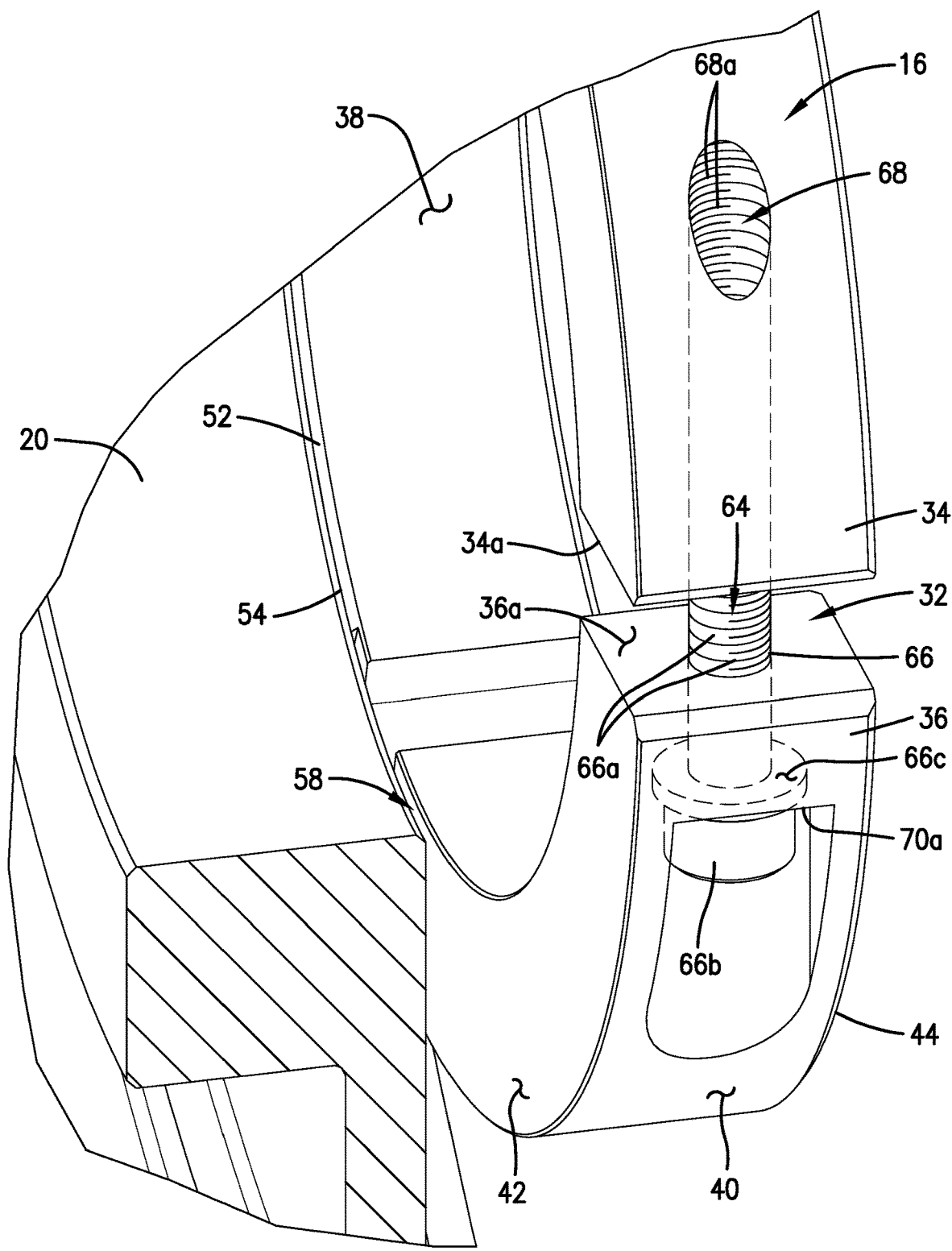
FIG. 4 is an enlarged, partially sectioned perspective view of the encoder disc and clamp of FIGS. 1-3B.

Referring to FIG. 4, the clamp 16 further preferably presents axially opposed front and back faces 42 and 44, respectively.

Coupling of Clamp and Encoder Disc

For effective operation of the encoder 14, the clamp 16 is robustly secured to the disc 20, with any possibility of relative rotation therebetween being eliminated or very nearly eliminated under the range of potential operating conditions.

In a preferred embodiment, a plurality of fastener-receiving clamp apertures 46 extend axially through the body 30. In the illustrated embodiment, the clamp apertures 46 are collectively arcuately centered between the ends 34 and 36, although non-centered configurations fall within the scope of some aspects of the present invention. Preferably, the clamp apertures 46 are counterbored to correspond to a plurality of fasteners 48 received therein. The fasteners 48 are preferably conventional bolts with at least partially threaded shanks and enlarged heads, although other types of fasteners fall within the scope of some aspects of the present invention.

The illustrated design, featuring counterbored clamp apertures 46, allows an alignment fixture (not shown) that is the same size as the shaft 12 to set the location of the clamp 16, reducing the need for tight tolerances and facilitating consistently excellent alignment. However, countersunk clamp apertures may be provided without departing from the scope of some aspects of the present invention. In yet another alternative embodiment, a combination of countersunk and counterbored clamp apertures may be provided. For instance, two (2) countersunk clamp apertures may facilitate clamp alignment without a fixture, with one (1) or more counterbored clamp apertures facilitating additional clamping force and shear area.

Figure 3:
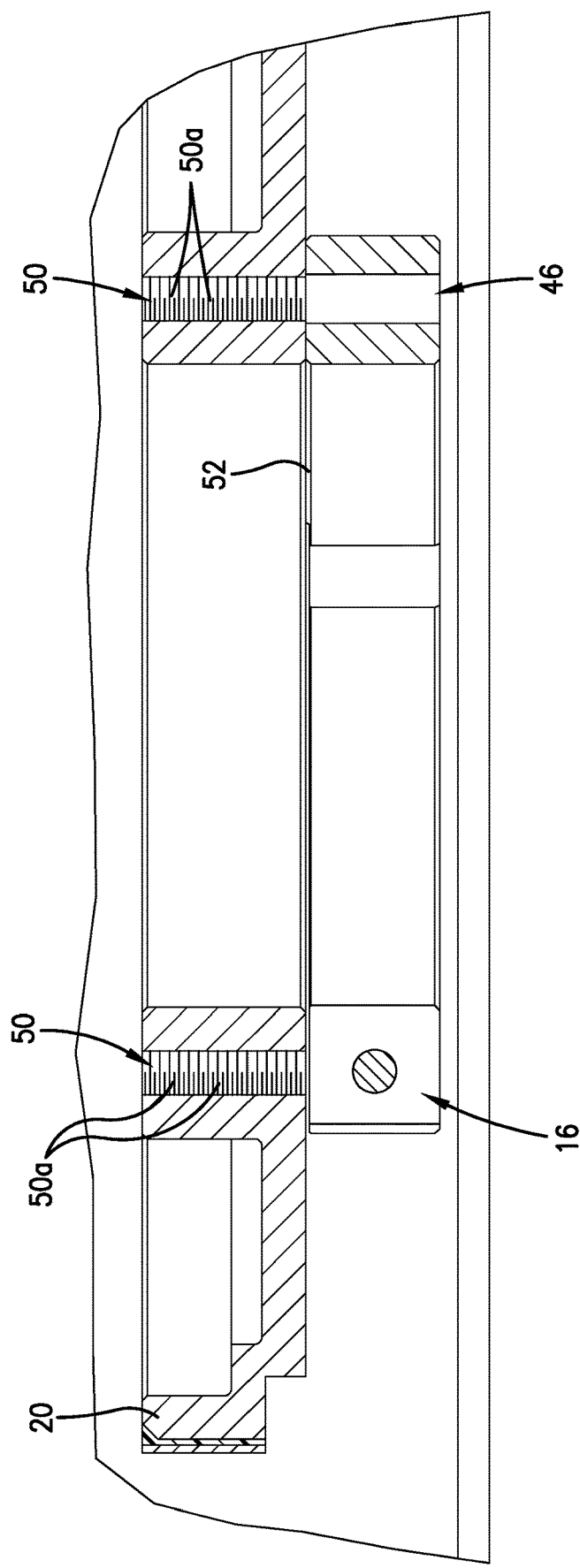
FIG. 3 is a cross-sectional view of the encoder disc and clamp of the encoder assembly of FIG. 2, taken along line 3-3 of FIG. 2.
Figure 3A:
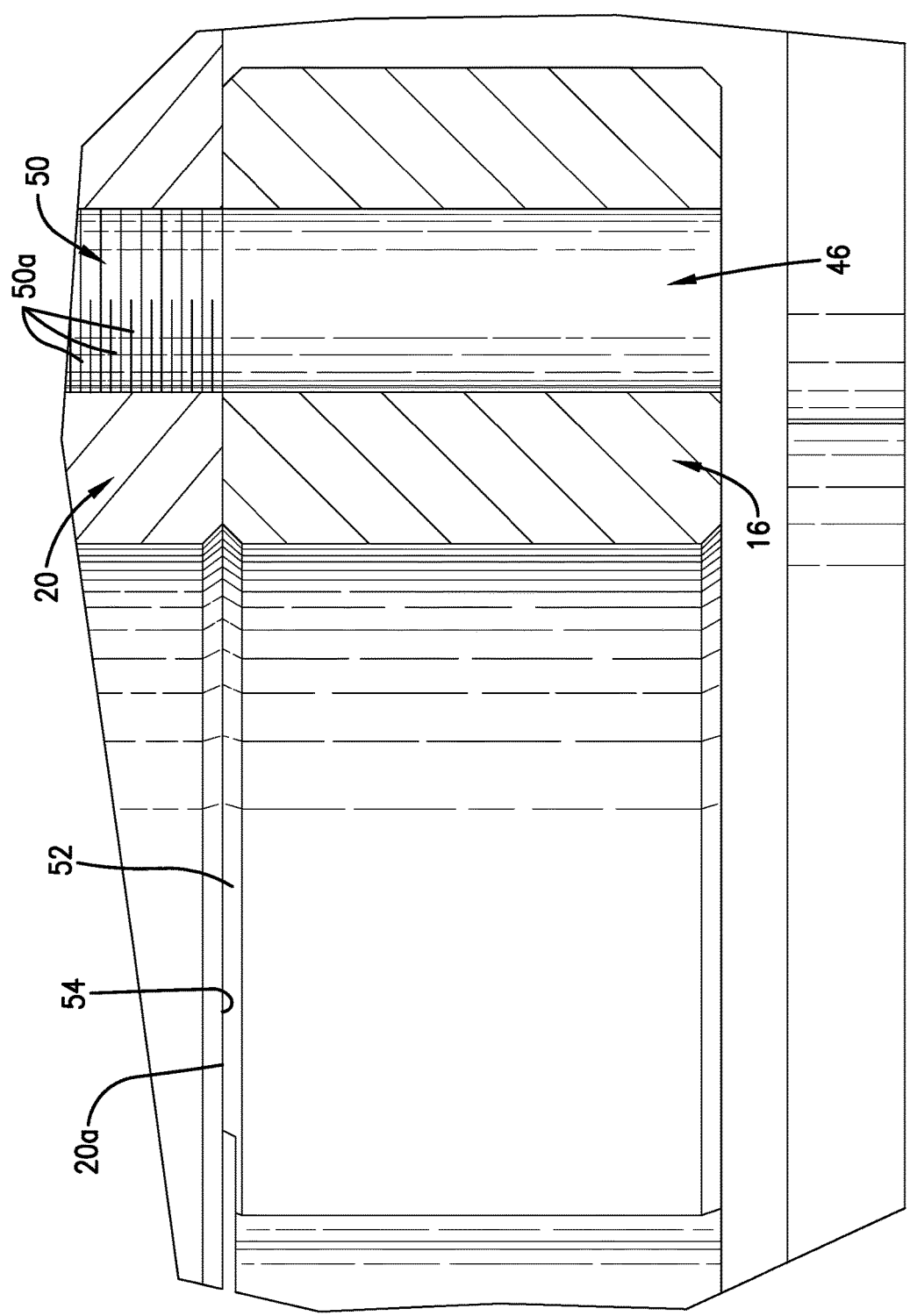
FIG. 3A is an enlarged view of a portion of the encoder disc and clamp as shown in FIG. 3, with shading provided for clarity.

Referring to FIGS. 3, 3A, and 3B, the clamp apertures 46 preferably correspond to disc apertures 50 defined by the disc 20, with the fasteners 48 extending through the clamp apertures 46 and into the disc apertures 50 to fixedly secure the clamp 16 to the disc 20.

Preferably, appropriately spaced apart disc apertures 50 are provided about the entire arcuate extent of the disc 20, enabling mounting of the clamp 16 with only minimal orientation required. That is, mounting in any orientation using any subset of the plurality of disc apertures 50 (the remaining disc apertures 50 thus being unused) is permissible.

As will be apparent from the preferred threaded configuration of the fasteners 48, it is most preferred that the disc apertures 50 are complementarily threaded with threads 50a. Full length threading is preferred, although partial threading may in some instances be permissible. It is also permissible for additional threading to be provided to the clamp apertures 46.

In the illustrated embodiment, four (4) fasteners 48 are provided. More or fewer fasteners may be provided in accordance with specific application needs, however. In applications for which rotational inertia, acceleration, and/or deceleration are low, for instance, fewer fasteners (and even perhaps only fastener) might be necessary, or vice versa.

It is also noted that the number of fasteners used may vary from the number of clamp apertures provided. In the illustrated embodiment, for instance, four (4) fasteners 48 are provided, in contrast to five (5) clamp apertures 46.

Axial Offset of Portion of Clamp from Disc

In a preferred embodiment, the clamp 16 includes an axially raised boss 52 extending from the front face 42 and presenting a contact face 54 spaced axially from the front face 42.

More particularly, the front face 42 of the clamp 16 preferably includes a first portion 42a adjacent the first end 34, a second portion 42b adjacent the second end 36, and an intermediate portion 42c disposed arcuately between the first and second portions 42a and 42b. The boss 52 preferably extends along and at least substantially overlies the intermediate portion 42c but leaves the first and second portions 42a and 42b exposed, such that first and second arcuately extending spaces 56 and 58, respectively, are defined between such portions 42a,b and the disc 20. Alternatively stated, the first and second portions 42a and 42b might be understood to be offset faces 42a and 42b, in contrast to the contact face 54.

In a preferred embodiment, the boss 52 corresponds to the clamp apertures 46. That is, the clamp apertures 46 extend through the boss 52, with the fasteners 48 thereby likewise extending therethrough for assembly of the clamp 16 onto the disc 20 as shown in FIG. 4. When the clamp 16 is secured to the disc 20, the contact face 54 fixedly engages the disc 20. The front face 42 is therefore at least in part spaced axially from the disc 20.

More particularly, the disc 20 presents a clamping face 20a. The contact face 54 fixedly engages the disc 20 along the clamping face 20a.

Upon tightening of the fasteners 48, the contact face 54 overlies and distributes compressive axial forces (that is, as generated by the fasteners 48) to the disc 20.

It is particularly noted that the clamp body 30 and boss 52 are most preferably designed such that the clamp 16 is devoid of contact with the encoder disc 20 except at the contact face 54. That is, the remaining portions of the clamp 16 (for example, the body 30 and in particular the exposed front face portions 42a and 42b thereof) do not slip or drag on the disc 20 during installation of the clamp 16 or during operation and rotation of the shaft 12, clamp 16, and encoder 14. Such limiting of contact between the clamp 16 and the disc 20 to the securely fastened, slip-and drag-resistant area of the contact face 54 of the boss 52 reduces the potential for damage to the disc 20 by the clamp 16.

In a preferred embodiment, the boss 52 is offset from the front face 42 by between about five thousandths (0.005) inches and about forty thousandths (0.040) inches, more preferably between about ten thousandths (0.010) inches and about thirty thousandths (0.030) inches, and most preferably about twenty thousandths (0.020) inches. These offset dimensions define the spaces 56 and 58 between the first and second portions 42a,b and the disc 20.

In a preferred embodiment, the boss 52 presents an arcuate extent that corresponds to the arcuate extent along which the clamp apertures 46 are distributed. More particularly, the arcuate extent of the boss 52 is slightly larger than the arcuate distribution range of the clamp apertures 46 in order to effectively distribute clamping forces 46 generated by the fasteners 48. In the illustrated embodiment, the boss 52 extends arcuately between about ninety (90) degrees and about one hundred fifty (150) degrees relative to the front face. More preferably, the boss 52 extends arcuately between about one hundred five (105) degrees and about one hundred thirty-five (135) degrees relative to the front face. Most preferably, the boss 52 extends arcuately about one hundred twenty (120) degrees relative to the front face.

In a preferred embodiment, as illustrated, the boss 52 is an integral part of the clamp 16. Alternatively stated, the boss 52 is preferably continuous and unitary with the clamp body 30. Such formation could be achieved via a variety of techniques, including but not limited to a machining process in which material is removed to form first and second portions 42a and 42b and material is retained to form the boss 52.

It is permissible according to some aspects of the present invention, however, for the boss to instead comprise a separate or discrete spacer component attached to or positioned relative to the clamp body. Although such an approach would require use of an additional part, machining (or other formation technique) complexity would be reduced.

Coupling of Clamp and Shaft

As described in detail above, for assembly of the encoder 14, the clamp 16 is secured to the disc 20 such that rotation of the clamp 16 is synchronous with that of the disc 20. As will be discussed in detail below, the shaft 12 is received by the clamp 16. The clamp 16 is adjustable to secure the shaft 12 within the clamp 16 such that relative rotation therebetween is eliminated or very nearly eliminated under the range of potential operating conditions. Thus, rotation of the shaft 12, the clamp 16, and the disc 20 is synchronous (or only very slightly deviates from such) within the limits of operation, facilitating accurate determination of the shaft rotation angle and other related parameters (for example, speed, direction, and count) via measurements(s) based on readings by the sensor 22 of the disc 20.

Adjustment Mechanism

Turning again to the design of the clamp 16, the inner face 38 may be understood to extend along a clamping path 60 (see FIGS. 7 and 8) that, as will be discussed in greater detail below, may be modified by means of an adjustment mechanism 64 shown in FIG. 4. That is, the clamp 16 is shiftable via the adjustment mechanism 64 between an undeformed state and any of a plurality of deformed states, with the clamping path 60 varying among the states. The gap 32 will vary in arcuate extent as a result of shifting between such states, as well.

The inner face 38 and, more broadly, the clamp 16 may alternatively or additionally be understood to define a generally cylindrical shaft-receiving lumen 62 having the clamping path 60 as its outer margin.

In a preferred embodiment, the gap 32 in the undeformed state of the body 30 is preferably relatively small in relation to the arcuate extent or circumference of the clamping path 60. For instance, the arcuate extent of the gap 32 is preferably less than about thirty (30) degrees between the ends 34 and 36, more preferably less than about twenty (20) degrees, and most preferably about twelve (12) degrees. Alternatively characterized, the arcuate dimension of the gap 32 at the inner face 38 is less than about fifteen (15) percent of the inner circumference of the body 30, more preferably less than about ten (10) percent of the inner circumference of the body 30, and most preferably about three (3) percent of the inner circumference of the body 30.

It is noted that, as will be discussed in greater detail below, it is likewise preferred that the gap be substantial enough in size to accommodate ease in fitment of the clamp 16 onto the shaft 12 (or insertion of the shaft 12 into the clamp 16). That is, the arcuate dimension of the gap 32 is preferably greater that about one (1) percent of the inner circumference of the body 30 to facilitate at least some degree of necessary deformation of the body 30.

Each end 34 and 36 presents a respective end face 34a and 36a. The end faces 34a and 36a are preferably oriented parallel to one another in an undeformed state of the clamp 16, as best shown in FIG. 4. Non-parallel orientations fall within the scope of some aspects of the present invention, however.

In a preferred embodiment, the clamp 16 additionally includes the aforementioned adjustment mechanism 64 for changing the arcuate extent of the gap 32 and, in turn, varying the circumference defined by the inner face 38 (that is, varying the clamping path 60). Such variation enables a secure fit of the clamp 16 to the shaft 12.

In the illustrated embodiment, and with primary reference to FIG. 4, the adjustment mechanism 64 includes a threaded fastener 66 having threads 66a, a head 66b, and an engagement surface 66c defined by the head 66b; a plurality of threads 68a (omitted in other FIGS. for simplicity and clarity) of an opening 68 extending through the face 34a and into the end 34; and a seating surface 70a adjacent an opening 70 extending through the face 36a and into the end 36. In a preferred embodiment, the opening 68 extends from the end face 34a to the outer face 40, although the opening 68 might alternatively be closed at the outer face.

As readily understood by those of ordinary skill in art in view of FIG. 4, engagement of the threads 66a of the fastener 66 with the threads 68a of the opening 68, in combination with engagement of the engagement surface 66c of the head 66b with the seating surface 70a, is such that rotation of the fastener 66 relative to the clamp 16 will result in shifting of the ends 34 and 36 toward or away from each other (depending on the directionalities of the rotation and of the threads 66a and 68a).

The threads 68a are preferably self-locking threads corresponding to standard threads 66a on the fastener 66. That is, the adjustment mechanism 64 in a broad sense is self-locking. It is particularly noted that in such a configuration, conventional (that is, off-the-shelf) fasteners may be used without detrimental effect on the self-locking feature.

It is permissible, however, for an alternative adjustment mechanism be provided in which specialized threads (for example, locking threads) are provided on the fastener, in association with the other of the openings, and/or in association with both of the openings. Locking threads might be omitted entirely, as well, although other design modifications (for example, provision of a nut or lock washer) to prevent or restrict loosening/backing out of the fastener would preferably be implemented.

Furthermore, any one of a variety of alternative adjustment mechanisms may be used without departing from the scope of some aspects of the present invention. A nut might additionally be provided, for instance, or a latch or hook system might replace the preferred threaded fastener.

Figure 9:
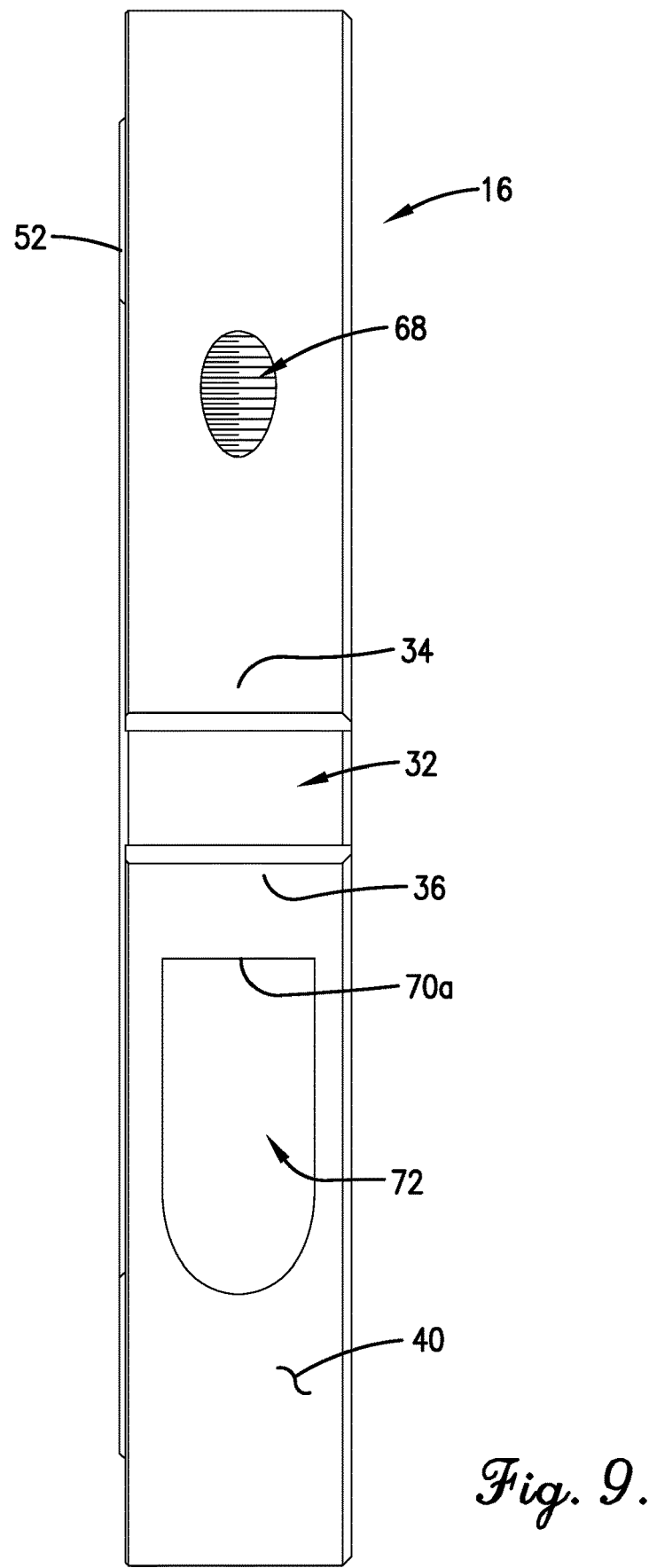
FIG. 9 is a side view of the clamp of FIGS. 5-8.

Referring to FIGS. 9 and 10, the body 30 of the clamp 16 preferably defines a recess or well 72 near the end 36 and extending from the outer face 40 to the opening 70 (or, alternatively stated, to the seating surface 70a). The fastener 66 is preferably inserted through the well 72 and into the opening 70, with the head 66b remaining in (that is, being seated in) the well 72 after tightening of the fastener 66.

As will be readily apparent to those of ordinary skill in the art, provision of the well 72 facilitates access to the opening 70 by the fastener 66. The well 72 further facilitates access to the fastener 66 and particularly the head thereof by a user or a tool for insertion, tightening, and/or loosening of the fastener 66. Omission of or alternative configuration of the well is permissible according to some aspects of the present invention, however.

As will be apparent to those of ordinary skill in the art, and as discussed in greater detail below, tightening of the adjustment mechanism 64 gradually draws the first and second ends 34 and 36 nearer to each other, resulting in a decrease in the size of the gap 32 and of the diameter of the clamping path 60. Alternatively stated, tightening of the adjustment mechanism 64 decreases the size of the lumen 62. Conversely, loosening of the adjustment mechanism 64 increases the size of the gap 32, the diameter of the clamping path 60, and the lumen 62 while allowing shifting of the ends 34 and 36 away from each other. Thus, the clamp 16 is continuously shiftable among the undeformed and deformed states thereof.

The resulting variations in the contour of the inner face 38 (and the clamping path 60) enable easy insertion of the shaft 12 into the clamp 16 when the clamp 16 is in the undeformed configuration and enable a secure connection/fit to be formed between the shaft 12 and the inner face 38 of the clamp 16 when the clamp 16 is in an appropriate deformed configuration.

Furthermore, because the adjustment mechanism 64 enables continuous variation of the lumen 62 as the ends 34 and 36 move toward or away from each other (that is, in contrast to only discrete undeformed and deformed clamp states), the clamp 16 is configured to readily accommodate minor variations in the outer diameter of the shaft 12 or, more broadly, the shape and size of the outer face 40 of the shaft 12, while still achieving a secure fit thereto. That is, the clamp 16 is configured to accommodate tolerances associated with shaft manufacture.

It is also noted that deformation of the clamp 16 is preferably through resilient or elastic shifting of the ends 34 and 36 relative to one another, with restoration of the original shape of the clamp 16 (that is, the undeformed state) thus being achievable.

Bending-Facilitating Cutouts

Figure 8:
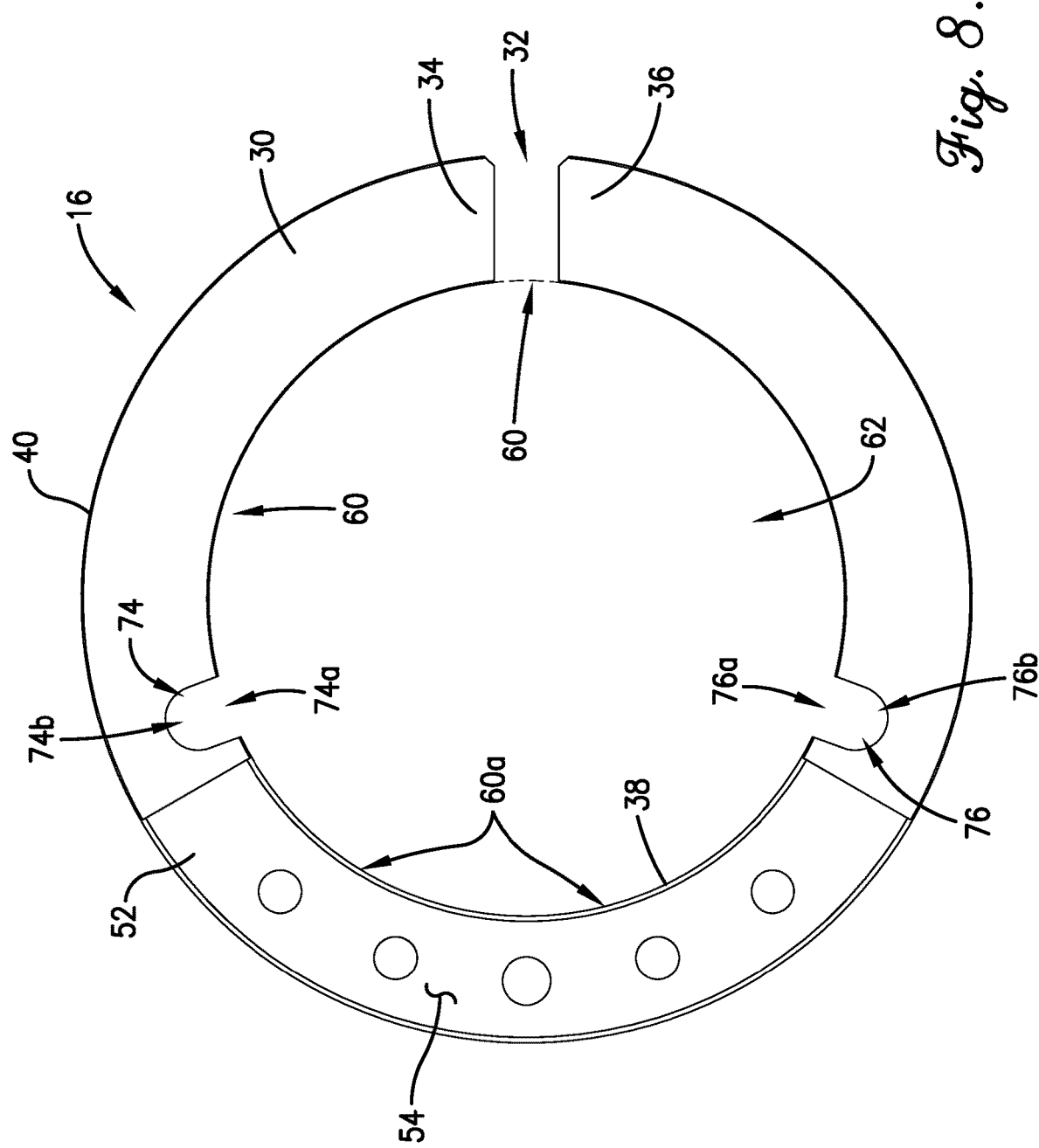
FIG. 8 is a front view of the clamp of FIGS. 5-7.

Referring to FIGS. 7 and 8, first and second arcuately spaced apart cutouts 74 and 76 are defined in the body 30. More particularly, the cutouts 74 and 76 extend radially outwardly from (and through) the inner face 38 of the body 30. It is permissible according to some aspects of the present invention for cutouts to additionally or alternatively extend from the outer face, however.

The cutouts 74 and 76 and the gap 32 are preferably at least substantially equally arcuately spaced apart from one another relative to the body 30. More particularly, the arcuate center of the first cutout 74 is preferably spaced about one hundred ten (110) degrees in a first arcuate direction from the arcuate center of the gap 32. The arcuate center of the second cutout 76 is preferably spaced about one hundred ten (110) degrees in a second arcuate direction, opposite the first arcuate direction, from the arcuate center of the gap 32. Thus, it will be readily apparent to those of ordinary skill in the art that the arcuate centers of the cutouts 74 and 76 are preferably spaced from one another by a slightly larger hundred forty (140) degrees. Deviations from such spacing fall within the scope of some aspects of the present invention, however. More or fewer that two (2) cutouts might be provided, as well.

Preferably, the cutouts 74 and 76 are positioned near opposite arcuate ends of the boss 52, with the boss 52 thus extending arcuately between the cutouts 74 and 76.

The cutouts 74 and 76 are configured to facilitate flexing of the clamp 16 so as to make easier the reduction or expansion of the lumen 62 as described above in response to utilization of the adjustment mechanism 64.

It is particularly noted that flexing of the clamp 16 preferably does not occur in the region associated with the boss 52, which is secured directly to the disc 20 by the fasteners 48. That is, the clamping path 60 preferably includes a boss portion 60a extending along the boss 52, with the boss 52 being fixed to the encoder disc 20 in such a manner (for example, by the fasteners 48) that modification of the boss portion 60a is restricted regardless of arcuate expansion or contraction of the gap 32. More broadly, the fasteners 48 preferably restrict modification of radially adjacent portions of the clamping path 60, regardless of whether or not such fasteners 48 are associated with the boss portion 60a.

As will be readily apparent to those of ordinary skill in the art, the flexibility and related properties of the clamp 16 in general are dependent on a variety of factors, including but not limited to the material comprising the body 30, the shapes of the cutouts 74 and 76, the sizes of the cutouts 74 and 76 relative to the body 30, the size of the gap 32, and the positioning of the cutouts 74 and 76 and the gap 32.

In a preferred embodiment, the body 30 comprises metal, although other materials fall within the scope of some aspects of the present invention.

Preferably, each cutout 74 and 76 is generally arched in form. More particularly, each cutout 74 and 76 preferably includes a rectangular base portion 74a or 76a and a semicircular or arched portion 74b or 76b.

In the undeformed state, the cutouts 74 and 76 each preferably present a maximum tangential width at the inner face 38. The cutouts 74 and 76 each also present an arcuately central maximum radial height measured from an imaginary arcuate line representing where the inner face 38 would be if extended arcuately, to the apex of the arched portion 74b or 76b, respectively. The height is preferably between five tenths (0.5) and one and five tenths (1.5) times the width and is most preferably equal to or about equal to the width. For instance, in a preferred embodiment, the width and height of each cutout 74 and 76 is between about two tenths (0.2) inches and about six tenths (0.6) inches, more preferably between about three tenths (0.3) inches and about five tenths (0.5) inches, and most preferably about four tenths (0.4) inches.

In a preferred embodiment, each cutout 74 and 76 also presents an arcuate extent at the inner face 38. The arcuate extent of each cutout is preferably less than about fifteen (15) percent of the inner circumference of the body 30, more preferably less than about ten (10) percent of the inner circumference of the body 30, and most preferably about three (3) percent of the inner circumference of the body 30. Alternatively stated, each cutout 74 and 76 preferably presents an arcuate extent at the inner face of about twelve (12) degrees.

The clamp body 30 preferably presents a radial width between the inner and outer faces 38 and 40 thereof. Such width is preferably arcuately constant, although variations in width fall within the scope of some aspects of the present invention. Most preferably, the width is between about five tenths (0.5) inches and about one (1) inch, more preferably between about six tenths (0.6) inches and about nine tenths (0.9) inches, and most preferably about seventy-five hundredths (0.75) inches.

The height of each cutout 74 and 76 is preferably between about twenty-five (25) percent and about seventy-five (75) percent of the width of the body 30. Most preferably, the height of each cutout 74 and 76 is about fifty (50) percent of the width of the body 30.

The body 30 also preferably presents an outer diameter at least substantially defined by the outer face 40 and an inner diameter defined by the inner face 38. The outer diameter is preferably between about three (3) inches and about nine (9) inches, more preferably between about four (4) inches and about seven (7) inches, and most preferably about five (5) inches. The inner diameter is preferably between about one (1) inch and about eight (8) inches, more preferably between about two (2) inches and about six (6) inches, and most preferably about three and five tenths (3.5) inches.

Preferably, the width of the body 30 is between about five (5) percent and about twenty-five (25) percent of the outer diameter of the body 30 in the undeformed state, more preferably between about ten (10) percent and about twenty (20) percent, and most preferably about fifteen (15) percent.

The size/proportionality and shape of each cutout 74 and 76, both with respect to itself and in relation to the body 30 of the clamp 16, along with the proportions of the body 30 itself, facilitates deflection of the body 30 at the cutouts 74 and 76 while minimizing or at least limiting to an acceptable level the stresses at the cutouts 74 and 76, provided the extent of the deflection of the clamp 16 is within reasonable limits associated with assembly of the encoder 14. As will be readily apparent to those of ordinary skill in the art, acceptable nominal stress levels will vary in keeping with material properties. In general, however, it is preferred that stresses associated with modification to the size of the gap 32 not exceed the elastic limit of the material. That is, the body 30 preferably deforms resiliently and retains its structural integrity under operational parameters.

Selected Advantages

As will be apparent from the above structural description, the encoder assembly 10 provides numerous advantages. For instance, the initially enlarged state of the lumen 62 when the clamp 16 is undeformed facilitates easy insertion of the shaft 12 into the clamp 16. Progressive modification of the clamping path 60 via the adjustment mechanism 64 enables secure interconnection between the clamp 16 and the shaft 12. The fasteners 48 facilitate secure connection of the clamp 16 to the encoder disc 20, and the boss 52 limits contact between the clamp 16 and the encoder disc 20 to minimize potential dragging or slipping of the clamp 16 on the disc 20 during installation and/or operation of the encoder 14. Broadly speaking, the encoder assembly 10 may be easily assembled yet provides effective interconnection between the motor shaft 12 and the encoder disc 20 as necessary for readings by the sensor assembly 22 to facilitate motor control.

Conclusion

Features of one or more embodiments described above may be used in various combinations with each other and/or may be used independently of one another. For instance, although a single disclosed embodiment may include a preferred combination of features, it is within the scope of certain aspects of the present invention for the embodiment to include only one (1) or less than all of the disclosed features, unless the specification expressly states otherwise or as might be understood by one of ordinary skill in the art. Therefore, embodiments of the present invention are not necessarily limited to the combination(s) of features described above.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The present application relies on the Doctrine of Equivalents to determine and access the reasonably fair scope of the present invention as pertains to any apparatus not materially departing from but outside the literal scope of the invention.

What is claimed is:

1. An encoder assembly configured to be operably coupled with a rotating component, said encoder assembly comprising:
    an encoder including a rotatable encoder disc; and
    a clamp configured to be secured to the rotating component to rotate therewith,
    said clamp being fixed to said encoder disc such that rotation of the encoder disc corresponds to rotation of the rotating component,
    said clamp including an arcuately extending body presenting arcuately spaced apart first and second ends and radially spaced apart inner and outer faces,
    said ends defining an arcuately extending gap therebetween,
    said inner face extending along a clamping path and being configured to at least in part engage the rotating component to secure the clamp to the rotating component,
    said clamp further including an adjustment mechanism configured to modify an arcuate extent of the gap by shifting said first and second ends relative to one another and, in turn, modifying the clamping path of the inner face,
    said body defining a radially extending cutout therein,
    said cutout extending from one of said inner and outer faces and facilitating bending of said body in association with arcuate expansion or contraction of said gap and modification of said clamping path.

2. The encoder assembly of claim 1,
    said cutout extending from said inner face.

3. The encoder assembly of claim 1,
    said body defining a plurality of said cutouts.

4. The encoder assembly of claim 3,
    said cutouts and said gap being at least substantially evenly arcuately spaced apart from one another.

5. The encoder assembly of claim 1,
    said cutout being at least in part arched in form.

6. The encoder assembly of claim 5,
    said cutout including an at least substantially rectangular base portion extending from said one of said inner and outer faces and a semicircular portion extending from said base portion.

7. The encoder assembly of claim 1,
    said body presenting a radial width between the inner and outer faces,
    said cutout presenting a radial height between about 25% and about 75% of the radial width of the body.

8. The encoder assembly of claim 7,
    said cutout presenting a radial height of about 50% of the radial width of the body.

9. The encoder assembly of claim 1, further comprising:
    a plurality of fasteners extending through the body to secure the body to the encoder disc, said fasteners restricting modification of radially adjacent portions of the clamping path.

10. The encoder assembly of claim 1,
    said adjustment mechanism including a threaded fastener and a corresponding set of self-locking threads defined in one of said first and second ends.

11. An encoder assembly configured to be operably coupled with a rotating component, said encoder assembly comprising:
    an encoder including an encoder disc rotatable about an axis; and
    a clamp configured to be secured to the rotating component to rotate therewith,
    said clamp being fixed to said encoder disc such that rotation of the encoder disc corresponds to rotation of the rotating component,
    said clamp including an arcuately extending body presenting axially opposed front and back faces,
    said clamp further including an axially raised boss extending from the front face and presenting a contact face spaced axially from said front face, said contact face fixedly engaging said encoder disc and said front face being at least in part spaced axially from said encoder disc.

12. The encoder assembly of claim 11, said body presenting arcuately spaced apart first and second ends, said front face including a first portion adjacent the first end and a second portion adjacent the second end, at least said first and second portions of the front face being spaced axially from said encoder disc.

13. The encoder assembly of claim 11, said clamp being devoid of contact with said encoder disc except at the contact face, such that an arcuately extending axial space is formed between the front face and the encoder disc.

14. The encoder assembly of claim 13, said boss extending axially from the front face between about 0.010 inches and about 0.030 inches, such that the space presents an axial dimension between about 0.010 inches and about 0.030 inches.

15. The encoder assembly of claim 11, said body presenting arcuately spaced apart first and second ends defining an arcuately extending gap therebetween, said front face including a first portion extending arcuately from the first end toward the second end, and a second portion extending arcuately from the second end toward the first end, said contact face being disposed arcuately between said first and second portions of the front face.

16. The encoder assembly of claim 11, said boss defining a plurality of clamp apertures, said encoder disc defining a plurality of disc apertures, said encoder assembly further comprising a plurality of fasteners extending through corresponding ones of the clamp apertures and disc apertures to secure the clamp to the encoder disc.

17. The encoder assembly of claim 11, said boss extending arcuately between about 90 degrees and about 150 degrees.

18. The encoder assembly of claim 11, said body presenting arcuately spaced apart first and second ends and radially spaced apart inner and outer faces, said ends defining an arcuately extending gap therebetween, said inner face extending along a clamping path and being configured to at least in part engage the rotating component to secure the clamp to the rotating component, said clamp further including an adjustment mechanism configured to modify an arcuate extent of the gap by shifting said first and second ends relative to one another and, in turn, modifying the clamping path of the inner face, said body defining a radially extending cutout therein, said cutout extending from one of said inner and outer faces and facilitating bending of said body in association with arcuate expansion or contraction of said gap and modification of said clamping path.

19. The encoder assembly of claim 11, said body defining a pair of said cutouts, said boss disposed arcuately between said cutouts.

20. The encoder assembly of claim 19, said clamping path including a boss portion extending along the boss, said boss being fixed to the encoder disc such that modification of the boss portion of the clamping path is restricted regardless of arcuate expansion or contraction of said gap.

* * * * *